United States Patent [19]

Thompson

[11] 3,925,869
[45] Dec. 16, 1975

[54] METHOD OF MAKING TENSION INDICATOR-TURNBUCKLE

[75] Inventor: Fredrick W. Thompson, Downey, Calif.

[73] Assignee: The United States of America as represented by the Secretary of the Air Force, Washington, D.C.

[22] Filed: Mar. 11, 1975

[21] Appl. No.: 557,419

Related U.S. Application Data

[62] Division of Ser. No. 431,197, Jan. 7, 1974, abandoned.

[52] U.S. Cl. ................ 29/175; 29/407; 403/27; 403/43
[51] Int. Cl.² .................................. B23P 13/00
[58] Field of Search ........ 29/175, 407, 404; 403/27, 403/43, 44, 45, 46, 47, 48, 41

[56] References Cited
UNITED STATES PATENTS 3,073,155  1/1963  Ianuzzi ........................ 73/141 A
3,389,924  6/1968  Bush et al ........................ 403/27

Primary Examiner—Victor A. DiPalma
Attorney, Agent, or Firm—Joseph E. Rusz; Arsen Tashjian

[57] ABSTRACT

A method of making a tension indicator-turnbuckle is disclosed comprising the steps of forming from elastic material a turnbuckle body having first and second axially aligned ends and a middle portion between the ends, internally threading the first and second ends, applying equally and simultaneously a preselected tension load to the first and second ends to temporarily deform the elastic body, forming a slit in the middle portion of the elastic body and, discontinuing the preselected tension load to the first and second ends whereby the elastic body returns to its original shape, and whereby the slit in the middle portion of the elastic body becomes a gap.

1 Claim, 3 Drawing Figures

METHOD OF MAKING TENSION INDICATOR-TURNBUCKLE

STATEMENT OF GOVERNMENT INTEREST

The invention described herein may be manufactured and used by or for the Government for governmental purposes without the payment of a royalty thereon.

CROSS REFERENCE TO RELATED APPLICATION

This application is a Division of copending U.S. Patent Application Ser. No. 431,197 filed Jan. 7, 1974, now abandoned.

BACKGROUND OF THE INVENTION

This invention relates to the turnbuckle art and, more particularly, to a turnbuckle which also functions as a tension (load) indicator.

Turnbuckles are well known. Equally well known is the time consuming effort needed to adjust and to readjust the turnbuckle in order to properly tighten the tension member(s) to which the turnbuckle is/(are) attached. The procedure of readjusting the turnbuckle is repeated and continues, of necessity, until the proper tension is attained, usually on a hit-or-miss trial-and-error basis.

Obviously, what is needed in the art is a turnbuckle with an integrated tension load indicator (hereinafter referred to as a "tension indicator-turnbuckle"), which can be quickly and easily placed into use, which is economical to manufacture, which is simple in structure and easy to operate, and of course is "fail-safe" in reliability.

I have invented such a tension load-turnbuckle; and, thereby, I have significantly advanced the state-of-the-art.

SUMMARY OF THE INVENTION

This invention pertains to a tension indicator-turnbuckle.

An object of this invention is to permit the effective use of a novel turnbuckle without the prior art necessity of having to adjust and readjust the turnbuckle numerous times in order to properly tension load the turnbuckle (i.e., to connect the turnbuckle quickly and easily to the tension load members with which it is to be used), thereby resulting in the saving of significant time.

Another object of this invention is to teach a novel turnbuckle which, in addition to its other fundamentally advantageous features, is simple in structure, is easy to operate, and is "fail-safe" in reliability.

Still another object of this invention is to teach a novel method of manufacturing the inventive tension indicator-turnbuckle.

These objects, and other and related ones, of this invention will become readily apparent after a consideration of the description of the invention and reference to the drawings.

DESCRIPTION OF THE INVENTIVE METHOD

The very basic and fundamental steps of my inventive method of manufacturing my novel tension indicator-turnbuckle comprises, essentially, five steps.

Firstly, I form, from elastic material, a body of preselected shape (such as 10A, FIG. 1), having an axis (such as longitudinal axis "A"–"B", FIG. 1, in this situation), with the preselected shape formed including a first end (such as 11, FIG. 1) and a second end (such as 12, FIG. 1) in axially aligned spaced-apart relationship along the axis "A"–"B", and also with the preselected shape formed including a middle portion (such as 13, FIG. 1) between the axially aligned first end 11 and second end 12.

Next, I thread the first end 11 and the second end 12, respectively, internally. The threading may be performed by any suitable conventional means and method. Said threading is shown in FIG. 1 and is designated generally as 11A in first end 11 and as 12A in second end 12.

Figure 1:
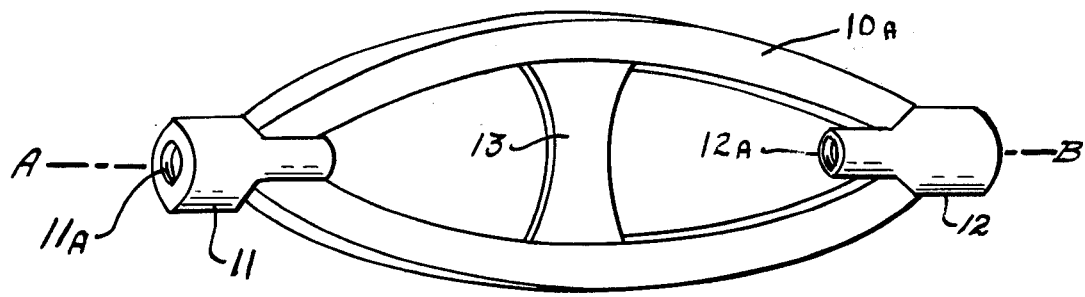
FIG. 1 is a side elevation view, in pictorial form, of a preferred embodiment of my inventive tension indicator-turnbuckle during an initial stage of its manufacture.
Figure 2:
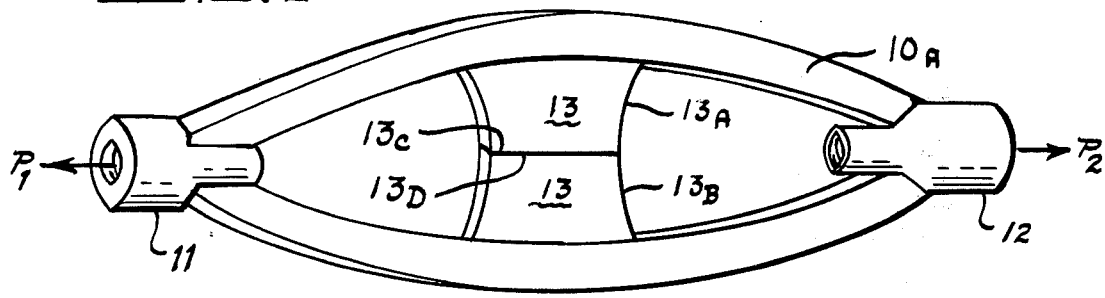
FIG. 2 is also a side elevation view, in pictorial form, of the preferred embodiment of my inventive tension indicator-turnbuckle, which was shown in FIG. 1, during a subsequent stage of its manufacture; and, FIG. 3 is also a side elevation view, also in pictorial form, of the preferred embodiment of my inventive tension indicator-turnbuckle, which was shown in FIGS. 1 and 2, at the completion of its manufacture and ready for use.

Then, I apply, simultaneously, a preselected tension load (such as $P_1$, FIG. 2) to first end 11, and an equal and directionally opposite tension load (such as $P_2$, FIG. 2) to the second end 12, with the result that the formed elastic body 10A, FIG. 1, deforms, as shown in FIG. 2.

Next, I form a slit (such as is limited and defined by edges 13C and 13D, FIG. 2) in the middle portion 13, FIG. 2, of the temporarily deformed elastic body 10, FIG. 2, thereby dividing middle portion 13 into an upper section 13A and a lower section 13B.

Lastly, I discontinue the application of the preselected tension loads $P_1$ and $P_2$ to, respectively, first end 11 and second end 12. As a result of this last step, the temporarily deformed elastic body 10A, FIG. 2, returns to its original preselected shape of FIG. 1, as shown in FIG. 3; and, the slit defined by edges 13C and 13D in the middle portion 13 of the temporarily deformed elastic body 10A FIG. 2, becomes a gap (such as "G," FIG. 3).

Thereby, my inventive tension indicator-turnbuckle is formed.

DESCRIPTION OF THE PREFERRED EMBODIMENT AND MANNER OF USE THEREOF

Figure 3:
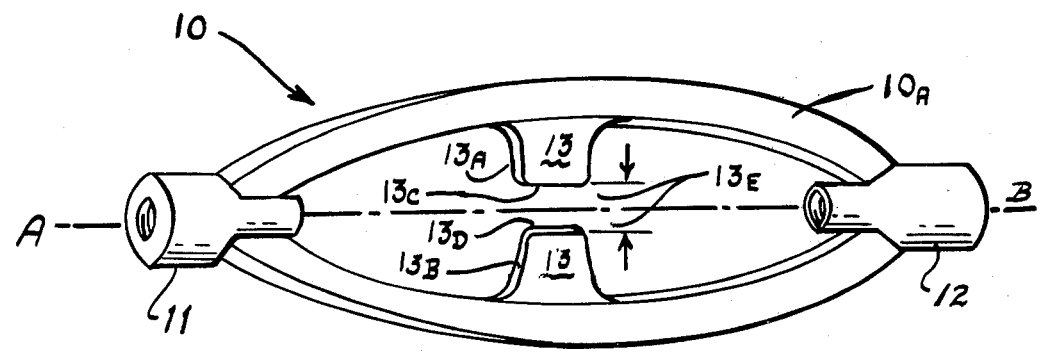

A preferred embodiment of my inventive tension indicator-turnbuckle is pictorially represented in FIG. 3 and is designated by reference numeral 10.

With reference to FIG. 3, the preferred embodiment 10 comprises a suitably configurated and dimensioned body 10A made of elastic material having an axis, A-B, and a first end 11 and a second end 12, which said ends 11 and 12 are suitably internally threaded, respectively, 11A and 12A and which said ends 11 and 12 are axially aligned in a spaced-apart relationship. The body 10A has a portion 13 intermediate the first end 11 and the second end 12, with said intermediate the first end 11 and the second end 12, with said intermediate portion having a gap 13E therein of predetermined width generally designated by reference character "G."

Here it is appropriate to note and to emphasize two preliminary and pertinent matters. Firstly, it is naturally assumed that preferred embodiment 10 will be used conventionally, i.e., in combination with a suitably threaded rod or the like screwed into the internally threaded end 11 and with another similarly (or identically) threaded rod screwed into the internally threaded end 12, to form in essence a coupling assembly. Secondly, it is also assumed that the preferred embodiment 10 (i.e., the inventive tension indicator-turnbuckle shown in FIG. 3) will be used in a situation where the tension loads applied in use to the preferred embodiment 10 are equal in magnitude to the equal and opposite tension loads $P_1$ and $P_2$ which were used in deforming body 10A, FIG. 2, during the manufacture of preferred embodiment 10, FIG. 3.

The manner of use and operation of my preferred embodiment 10 is very easily understood from the foregoing description, coupled with reference to the Figures, particularly FIG. 3.

In essence, when my inventive tension indicator-turnbuckle is in use, and the sections 13A and 13B of the middle portion 13 thereof 10 move toward each other, and abut at edges 13C and 13D respectively, and gap 13E closes (and, of course width "G" thereof has diminished and has been eliminated), and edges 13C and 13D remain abutted, then the desired and preselected tension loads are being applied. In other words, when the gap 13E is closed, this closed position visually indicates that the turnbuckle is in or at the proper tension (i.e., the magnitude of the tension load is of the desired and preselected magnitude and direction). It is to be noted and remembered, however, that visibility of the turnbuckle 10 (and, more specifically, of edges 13C and 13D thereof) is not necessary, since the closing of the gap 13E and the full closure thereof 13E easily may be ascertained by physical touching, i.e., manually, by "feel."

CONCLUSION

It is abundantly clear from all of the foregoing, and from the drawing herein, that the stated desired objects of my invention have been attained. In addition, related desirable objects, such as the elimination of readjustment after each use and the fact that there is nothing to get out of adjustment during handling or service, are also achieved.

It is to be noted that, although there have been described the fundamental and unique features of my invention as applied to a preferred embodiment and to a method of manufacturing the preferred embodiment, various other embodiment, substitutions, additions, omissions, adaptations, and the like, will occur to, and can be made by, those of ordinary skill in the art, without departing from the spirit of my invention.

What I claim is:

1. The method of manufacturing a tension indicator-turnbuckle, comprising the steps of:
   a. forming, from elastic material, a body of preselected shape and having an axis, wherein said preselected shape includes a first end and a second end in axially aligned spaced-apart relationship along said axis, and further wherein said preselected shape also includes a middle portion between said axially aligned first end and second end;
   b. threading said first end and said second end internally;
   c. applying simultaneously a preselected tension load to said first end, and an equal and directionally opposite tension load to said second end, whereby said formed elastic body temporarily deforms;
   d. forming a slit in said middle portion of said temporarily deformed elastic body;
   e. and, discontinuing the application of said preselected tension load to said first end and of said preselected oppositely directed equal tension load to said second end;

whereby the temporarily deformed elastic body returns to its original preselected shape, and whereby said slit formed in said middle portion of said temporarily deformed elastic body becomes a gap, and also whereby the complete closing of the gap resulting from the subsequent application of tension loads to said first end and said second end of said elastic body is a visual indication that the applied tension loads are equal to the preselected loads which were originally applied to said first and second ends to temporarily deform the said formed elastic body.

* * * * *